US011360000B2

(12) United States Patent
Bayarovich et al.

(10) Patent No.: US 11,360,000 B2
(45) Date of Patent: Jun. 14, 2022

(54) PRIORITY-BASED DYNAMIC RESOURCE ALLOCATION FOR PRODUCT TESTING

(71) Applicant: SK hynix Inc., Gyeonggi-do (KR)

(72) Inventors: Svetlana Bayarovich, Minsk (BY); Maryia Smouzh, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/825,721

(22) Filed: Mar. 20, 2020

(65) Prior Publication Data

US 2021/0293664 A1 Sep. 23, 2021

(51) Int. Cl.
*G01M 99/00* (2011.01)

(52) U.S. Cl.
CPC ................................... *G01M 99/00* (2013.01)

(58) Field of Classification Search
CPC ...................................................... G01M 99/00
See application file for complete search history.

(56) References Cited

U.S. PATENT DOCUMENTS

| | | | |
|---|---|---|---|
| 5,319,645 A | 6/1994 | Bassi et al. | |
| 6,014,760 A * | 1/2000 | Silva | G01R 31/318307 714/46 |
| 6,163,805 A * | 12/2000 | Silva | G06F 11/2294 709/221 |
| 6,324,683 B1 | 11/2001 | Fuh et al. | |
| 6,477,666 B1 | 11/2002 | Sanchez et al. | |
| 6,701,460 B1 | 3/2004 | Suwandi et al. | |
| 6,754,895 B1 | 6/2004 | Bartel et al. | |
| 6,907,546 B1 | 6/2005 | Haswell et al. | |
| 7,516,443 B2 | 4/2009 | Creamer et al. | |
| 7,823,135 B2 | 10/2010 | Horning et al. | |
| 7,987,397 B2 | 7/2011 | Yang | |
| 8,271,949 B2 | 9/2012 | Bernardini et al. | |
| 8,418,000 B1 | 4/2013 | Salame | |
| 8,489,474 B2 | 7/2013 | Crook et al. | |
| 8,739,126 B2 | 5/2014 | Glaser et al. | |
| 8,874,598 B2 | 10/2014 | Spengler et al. | |
| 8,984,486 B2 | 3/2015 | Nayak | |
| 9,146,837 B2 | 9/2015 | Jamison | |
| 9,310,437 B2 * | 4/2016 | Chen | G01R 31/31919 |
| 9,424,171 B1 * | 8/2016 | Chirgwin | G06F 11/3664 |
| 9,652,364 B1 | 5/2017 | Kaila et al. | |
| 9,721,086 B2 | 8/2017 | Shear et al. | |
| 9,727,361 B2 | 8/2017 | Anand et al. | |
| 10,684,940 B1 | 6/2020 | Kayal et al. | |

(Continued)

OTHER PUBLICATIONS

Thoss M et al., A Framework-Based Approach for Automated Testing of CNC Firmware, 2014, pp. 7-12, Jamaica 2014.

(Continued)

*Primary Examiner* — John E Breene
*Assistant Examiner* — Eyob Hagos
(74) *Attorney, Agent, or Firm* — IP & T Group LLP (57) ABSTRACT

Systems and methods to dynamically allocate resources in product test automation. In a testing lab, multiple tests are run on multiple machines to test multiple products, where each product has an initial priority. A test distributor calculates, for each product, a specific number of machines on which that product is to be tested based on the initial priority of that product; determines a number of remaining machines not being used in testing; determines one or more products being tested that need one or more additional machines for testing; and determines, for each product identified as needing one or more additional machines for testing, a number of machines to be allocated to run the tests for that product.

10 Claims, 6 Drawing Sheets

(56) References Cited

U.S. PATENT DOCUMENTS

| | | | |
|---|---|---|---|
| 2003/0051188 A1* | 3/2003 | Patil | G06F 11/3672 714/4.4 |
| 2006/0066293 A1* | 3/2006 | Gopal | G01R 31/2867 324/750.14 |
| 2007/0132477 A1* | 6/2007 | Balog | G01R 31/31707 324/762.01 |
| 2012/0185832 A1* | 7/2012 | Rossi | G06F 11/3688 717/131 |
| 2015/0082090 A1* | 3/2015 | Holden | G06F 11/263 714/25 |
| 2017/0046510 A1* | 2/2017 | Chen | G06N 20/00 |
| 2018/0018680 A1* | 1/2018 | Bs | G06F 11/368 |
| 2019/0317886 A1 | 10/2019 | Smith et al. | |
| 2020/0050493 A1 | 2/2020 | Milojicic et al. | |
| 2021/0293664 A1 | 9/2021 | Bayarovich et al. | |

OTHER PUBLICATIONS

Ahn S et al., Automated Firmware Testing using Firmware-Hardware Interaction Patterns, 2014, pp. 1-10, IEEE, International Conference on Hardware/Software Codesign and System Synthesis (CODES+ISSS).

Srivastava P et al., FirmFuzz: Automated IoT Firmware Introspection and Analysis, Session 1: Attack and Defense, pp. 15-21,2019, IoT-S&P'19, London, United Kingdom.

Office Action issued by the USPTO for U.S. Appl. No. 17/012,923 dated Jul. 23, 2021.

Fdasyuk al., Architecture of a Tool for Automated Testing the Worst-Case Execution Time of Real-Time Embedded Systems' Firmware, 2017, pp. 278-281, IEEE.

Snyder A. F. et al., The Realities of Testing Meter Firmware Upgradeability, 2014, IEEE.

Finkelman D, Combining Visual TEST with ICE for Embedded System Testing, 1996, pp. 160-161, IEEE.

Berg H. K, Firmware testing and test data selection, 1981, pp. 75-80, ACM-National Computer Conference.

Benz S, Combining Test Case Generation for Component and Integration Testing, 2007, pp. 23-33, ACM.

Notice of Allowance issued by the USPTO for U.S. Appl. No. 17/012,923 dated Dec. 20, 2021.

* cited by examiner

PRIORITY-BASED DYNAMIC RESOURCE ALLOCATION FOR PRODUCT TESTING

BACKGROUND

1. Field

Embodiments of the present disclosure relate to systems and methods employing dynamic resource distribution in the testing of products, taking into account product priorities that may change as the testing progresses.

2. Description of the Related Art

In testing products, typically a set of tests are run on a limited number of testing machines. Tests can be executed in a specified order, with each machine running only one test. The number of tests in each set as well as the duration of each test may vary. The start time of a test set may be determined by a person responsible for the testing. Thus, in such a testing scenario, efficient distribution of machines among products is a pressing issue.

In this context, embodiments of the present invention arise.

SUMMARY

An aspect of the present invention is directed to methods of running tests on machines to test products. In one such method, $M_i$ tests are run on L machines to test K products, each product having an initial priority $P_i$, where each of $M_i$, K and L is an arbitrary integer greater than 0, and where i is an integer from 1 to K. The method comprises calculating, for each $i^{th}$ product, $l_i$ machines of the L machines proportionally to the initial priority $P_i$ of the $i^{th}$ product; determining a number of remaining machines $\tilde{L}$ based on L and $n_i$, which is the maximum number of machines needed for running tests for the $i^{th}$ product, where $n_i$ is the lesser of $l_i$ and $M_i$; accumulating $n_i$ per product; repeating the calculating, determining and accumulating operations until $\tilde{L}$ is 0; and when $\tilde{L}$ is 0, determining, for each $i^{th}$ product, a number of machines to be allocated to run the tests for that product.

Another aspect of the present invention is directed to testing systems. One such testing system comprises a test distributor; and L testing machines to run $M_i$ tests to test K products, each product having an initial priority $P_i$, where each of $M_i$, K and L is an arbitrary integer greater than 0, and where i is an integer from 1 to K. The test distributor is configured to calculate, for each $i^{th}$ product, $l_i$ machines of the L machines proportionally to the initial priority $P_i$ of the $i^{th}$ product; determine a number of remaining machines $\tilde{L}$ based on L and $n_i$, which is the maximum number of machines needed for running tests for the $i^{th}$ product, where $n_i$ is the lesser of $l_i$ and $M_i$; accumulate $n_i$ per product; repeat the calculating, determining and accumulating operations until $\tilde{L}$ is 0; and determine, when $\tilde{L}$ is 0, for each $i^{th}$ product, a number of machines to be allocated to run the tests for that product.

Still another aspect of the present invention entails a method of running multiple tests on multiple machines to test multiple products, each product having an initial priority. The method comprises calculating, for each product, a specific number of the multiple machines based on the initial priority of that product; determining a number of remaining machines not being used in testing; determining one or more products being tested that need one or more additional machines for testing; and determining, for each product identified as needing one or more additional machines for testing, a number of machines to be allocated to run the tests for that product.

Additional aspects of the present invention will become apparent from the following description.

DETAILED DESCRIPTION

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer readable storage medium; and/or a processor, such as a processor suitable for executing instructions stored on and/or provided by a device coupled to the processor. In this specification, these implementations, or any other form that the invention may take, may be referred to as techniques. In general, the order of the steps of disclosed processes may be altered within the scope of the invention. Unless stated otherwise, a component such as a processor or the like described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment, nor to any specific details. The scope of the invention is limited only by the claims. The invention encompasses numerous alternatives, modifications and equivalents that fall within the scope of the claims.

Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

The inventors have discovered that manually dividing testing machines into groups, assigning each group to a particular product to be tested, and running tests for the respective products on machines in the respective groups resulted in problems.

One such problem is an unbalanced load among the testing machines. For example, one or more tests of a particular product are still waiting to be executed, because all of the testing machines in the group dedicated to that product are busy running another test for that product. At the same time, machines in groups dedicated to other products are idle. Also, one or more test machines may crash during test execution, e.g., due to hardware failure, which decreases the number of machines in a particular group, which in turn may result in an even greater load imbalance.

Another problem is lack of flexibility. Sometimes product testing parameters need to be changed after testing has commenced. For example, it may be determined during the testing process that a particular product requires more tests than initially determined, or that the duration of one or more existing tests needs to be changed. In any of these scenarios, a group rebalancing problem arises, since group sizes are configured manually. Moreover, testing protocol typically requires that in-progress testing not be stopped for machine rebalancing. Thus, it is necessary to wait for a test to finish on a particular machine before that machine is reassigned to another group.

In sum, the problems are mainly about adjusting resource allocation to current testing needs. Sometimes that means obtaining results faster for a product with higher priority while avoiding blocking the testing of other products, i.e., continuing to run tests of the other products. A priority is indicative of urgency; that is, priorities indicate which product(s) need faster results, and hence, to which product(s) more resources need to be allocated. The results of each test can be analyzed right after that test is completed, without waiting until all tests for that product, i.e., a full testing campaign, are completed.

Embodiments of the present invention are directed to solving the problem of computational dynamic resource distribution in accordance with specified product priorities that can change at any moment. Each time the inventive algorithm is triggered, the algorithm advantageously uses up-to-date priorities and initiates runtime resource rebalancing for all products in the running of their testing campaigns.

Figure 1:
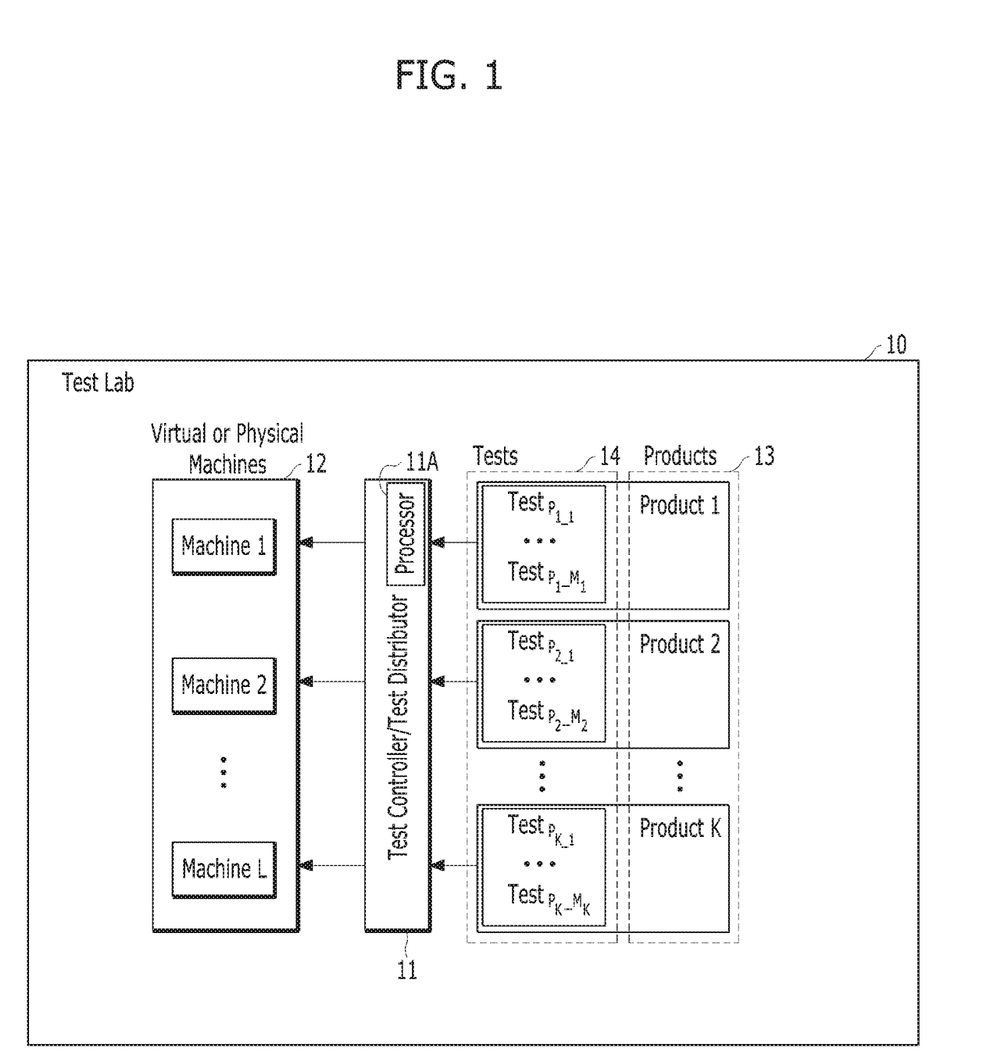
FIG. 1 is a schematic diagram illustrating a testing lab in accordance with an embodiment of the present invention.

FIG. 1 is a schematic diagram illustrating a testing lab in accordance with an embodiment of the present invention. Such testing lab 10 comprises a test controller or distributor 11 and L testing machines, individually and collectively identified by 12, and K products to be tested, individually and collectively identified by 13. $M_i$ tests are to be run on L machines for testing K products, where i=1, . . . , K. Each of the products is assigned a priority $P_i$, where $P_i$ is an arbitrary integer greater than 0. The priority for each product may be assigned by a person responsible for, or in charge of, the testing. How the resources to be allocated are calculated for the testing of each product in accordance with product priorities $P_i$ is described below. The test distributor 11, which selects a test for further execution by using the results obtained by the resource allocation calculation, is also described below. The test distributor 11 may include a processor 11A for performing the resource allocation calculations. Alternatively, a processor embodied in another device, e.g., a computer, may perform the calculations, the results of which are then transmitted to the test distributor 11.

The overall solution, in accordance with embodiments of the invention, offers several benefits. One benefit is that the inventive methodology minimizes effort and errors associated with manual resource distribution. Another benefit is that runtime resource rebalancing satisfies changing product needs. Still another benefit of the effective resource distribution and usage provided by embodiments of the present invention compared to manual resource distribution is reduction in overall testing time, including the time spent waiting for test results.

Figure 2:
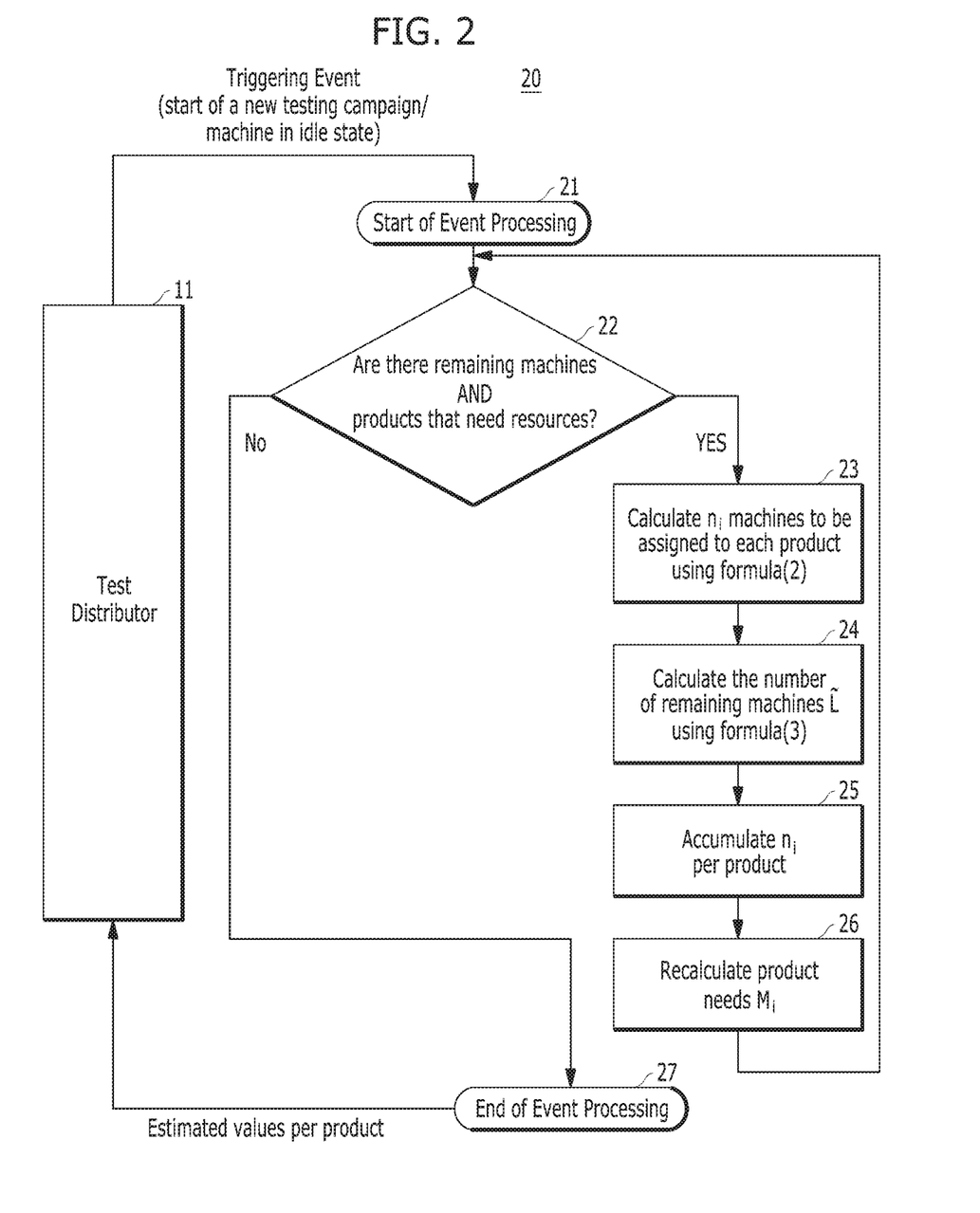
FIG. 2 is a flow chart illustrating a method of calculating resources to be allocated to each product based on assigned priorities, in accordance with an embodiment of the present invention.

FIG. 2 is a flow chart illustrating a method of calculating resources to be allocated to each product based on assigned priorities, in accordance with an embodiment of the present invention. FIG. 2 shows flow and operation examples. Those skilled in the art will understand that additional and/or alternative components may be used and steps performed to effectuate aspects of the present invention without departing from the inventive concepts disclosed herein. The flow diagram 20 of FIG. 2 is described with secondary reference to FIG. 1.

Referring to FIG. 2, the method illustrated in flow diagram 20 is triggered each time the state of the test distributor 11 changes, which occurs when a new set of tests, i.e., a new testing campaign starts, one or more testing machines 12 is in an idle state (e.g., released from previous testing) and/or product priorities change. Any such triggering event results in the start of event processing (step 21).

Initially, for each $i^{th}$ product, the algorithm calculates $l_i$ machines proportionally to the assigned priorities $P_i$ as weighting factors, where $l_i$:

$$l_i = \frac{P_i}{\sum_{j=1}^{K} P_j} \times L \qquad (1)$$

Considering that each $i^{th}$ product needs no more machines than it has tests to run ($M_i$), $n_i$ machines should be allocated for its testing campaigns, where $n_i$:

$$n_i = \min(l_i, M_i) \qquad (2)$$

As $\sum_{i=1}^{K} l_i = L$ and $l_i \geq n_i$, then $\sum_{i=1}^{K} n_i \leq L$. This means that some products may require fewer machines than $l_i$ initially calculated. Thus, the number of remaining machines $\tilde{L}$ is:

$$\tilde{L} = L - \sum_{i=1}^{K} n_i \qquad (3)$$

If $\tilde{L} > 0$ and there are products that still require resources, as determined in step 22, $n_i$ machines that need to be assigned to each product is calculated using formula (2) at step 23. Then, the number of remaining machines $\tilde{L}$ is calculated using formula (3) at step 24, followed by accumulating $n_i$ machines per product at step 25. That is, calculations in accordance with formulas (1)-(3) are repeated, including accumulating estimated values from formula (2), at each iteration.

When it is eventually determined that there are no remaining machines and no products that need resources (No at step 22), that indicates the end of event processing (step 27). At that time, estimated values per product are sent to the test runner 11. These values are used by the test runner 11 to select the tests of such product where the number of machines allocated is smaller than the estimated value.

The distribution method or algorithm may be triggered each time a new testing campaign begins or one or more of the machines becomes idle (i.e., currently unused).

The following examples further demonstrate the benefits of the inventive resource distribution method. Consider a scenario in which two products need to be tested. To test the first product (Product 1), a testing campaign (TC1) of 60 tests needs to be run starting at 00:10. Two testing campaigns are needed for the second product (Product 2). One of the testing campaigns (TC2) consists of 70 tests and starts at 00:00, while the other testing campaign (TC3) consists of 80 tests and starts at 00:50. In all testing campaigns, each test duration is 10 minutes.

Figure 3:
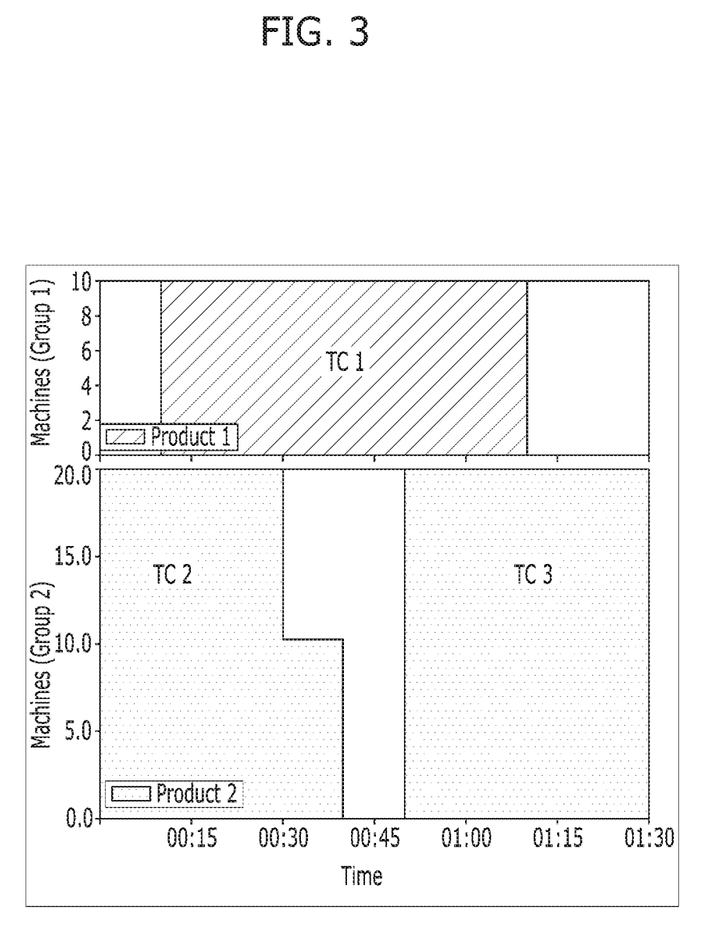
FIG. 3 is a diagram illustrating the results of a manual approach to resource distribution.

FIG. 3 illustrates the results of a manual approach to resource distribution. In this example, all testing machines are manually managed as follows: a group of 10 testing machines (Group 1) is assigned to Product 1, and a group of 20 testing machines (Group 2) is assigned to Product 2. With this resource distribution, test campaign end times are as follows: TC1 is completed at 01:10; TC2 is completed at 00:40; and TC3 is completed at 01:30. Group 2 has idle machines indicated by the cut-out area of the block representing TC2.

Figure 4:
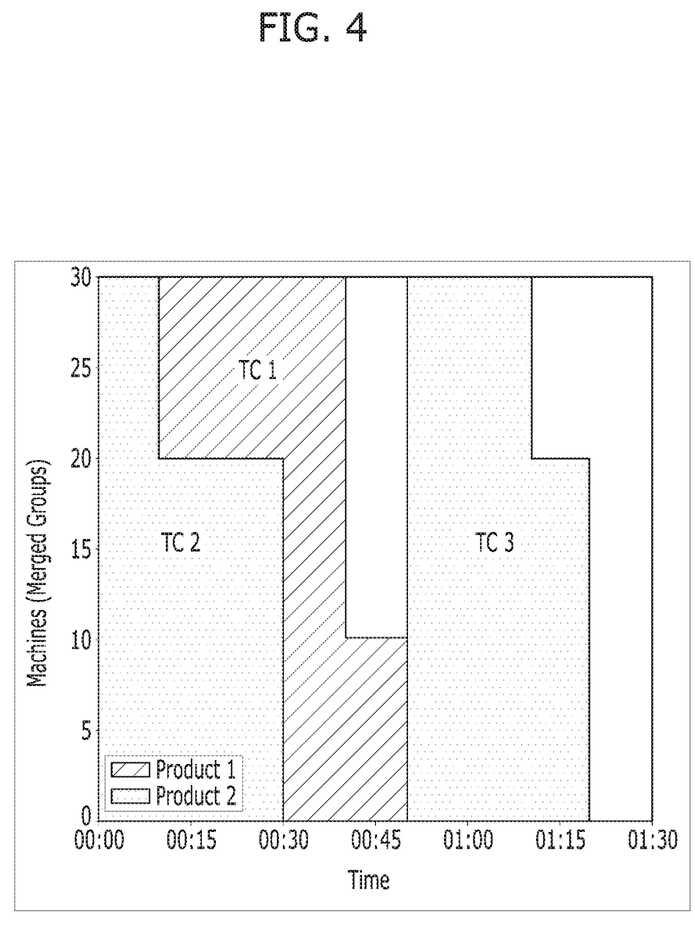
FIG. 4 is a diagram illustrating resource distribution in accordance with an embodiment of the invention.

In another example, after merging machines into one group (total number of machines L is 30) and distributing machines in accordance with the resource allocation method of the present invention with product priorities: $P_1=1$, $P_2=2$, which may be set per product needs, resource distribution changes as shown in FIG. 4, which illustrates algorithmic distribution according to an embodiment of the invention. The algorithm calculates the estimated values at 00:00, 00:10, 00:20 and 00:30.

At 00:00, TC2 starts. The resource allocation method is triggered for the first time. Product 1 has 0 tests to run, and Product 2 has 70 tests to run. Thus, only Product 2 and its priority is involved in the calculation.

Iteration 1 (Includes Steps 22-26 of FIG. 2)

Proportional products quota (number of machines) $l_2=2/2 \times 30=30$. According to product needs, $n_2=\min(30, 80)=30$. Remaining machines $\tilde{L}=30-30=0$. Thus, the iteration stops. The estimated values (number of machines) returned are: 0 for Product 1 and 30 for Product 2.

At 00:10, the resource allocation algorithm is triggered again on TC1 start. Product 1 has 60 tests to run, and Product 2 still has 40 tests in queue.

Iteration 1

Proportional products quota $l_1=1/(1+2)\times30=10$, $l_2=2/(1+2)\times30=20$. According to product needs, $n_1=\min(10, 60)=10$, $n_2=\min(20, 40)=20$. Remaining machines $\tilde{L}=30-(10+20)=0$. Thus, the iteration stops. The estimated values (number of machines) returned are: 10 for Product 1 and 20 for Product 2.

At 00:30 the algorithm is also triggered on test completion. Product 1 has 40 tests to run, Product 2 has 0 tests to run. Thus, only Product 1 and its priority is involved in the calculation.

Iteration 1

Proportional products quota $l_1=1/1\times30=30$. According to product needs, $n_1=\min(30, 40)=30$. Remaining machines $\tilde{L}=30-30=0$. Thus, the iteration stops. The estimated values (number of machines) returned are: 30 for Product 1 and 0 for Product 2.

As can be seen from these calculations, the algorithm, according to an embodiment of the invention, adapted to the needs of products. That is, when one product had no tests to run, all machines are assigned to the other product. Free machines (indicated by the cut-out area of the block representing TC1 in FIG. 4) remain only because there is no request for a test run (no tests to be executed).

Compared to the manual distribution scenario illustrated in FIG. 3, each test campaign (TC) duration has been reduced. TC 1 finishes at 00:50 compared to 01:10; thus, duration is shortened from 60 min. to 40 min. TC 2 finishes at 00:30 compared to 00:40; thus, duration is shortened from 40 min. to 30 min. TC 3 finishes at 01:20 compared to 01:30; thus, duration is shortened from 40 min. to 30 min.

Figure 5:
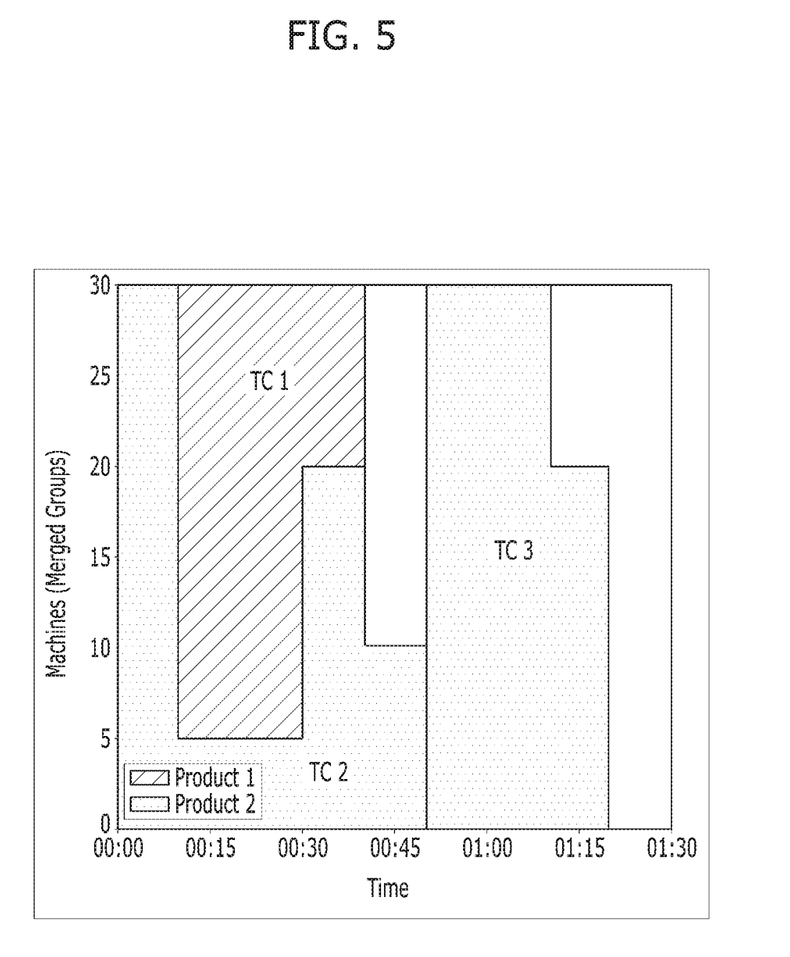
FIG. 5 is a diagram showing how resource distribution changes compared to the scenario in FIG. 4 with new product priority values in accordance with an embodiment of the present invention.

In another example, FIG. 5 shows how resource distribution changes compared to the scenario in FIG. 4 with new product priority values $P_1=5$, $P_2=1$ in accordance with an embodiment of the present invention. After increasing Product 1 priority, more machines were allocated to it and its TC1 end time has shortened in comparison with the example in FIG. 4 (from 40 min. to 30 min.).

This is an example of a scenario in which the algorithm calculations require two iterations at 00:30 when Product 1 has 10 tests to run and Product 2 has 30 tests to run.

Iteration 1

Proportional products quota $l_1=5/(5+1)\times30=25$, $l_2=1/(5+1)\times30=5$. According to product needs, $n_1=\min(25, 10)=10$, $n_2=\min(5, 10)=5$. Remaining machines $\tilde{L}=30-(10+5)=15$. Accumulated $n_1$ is $0+10=10$, $n_2$ is $0+5=5$. Product needs are $M_1=10-10=0$, $M_2=30-5=25$.

Since L>0 and Product 2 requires more resources, a new iteration starts.

Iteration 2

$l_2=1/1\times15=15$. According to product needs, $n_2=\min(15, 25)=15$. Remaining machines $\tilde{L}=15-15=0$. Accumulated $n_2$ is $5+15=20$. $\tilde{L}=0$. Thus, the iteration stops. The estimated values (number of machines) are: 10 for Product 1 and 20 for Product 2.

Figure 6:
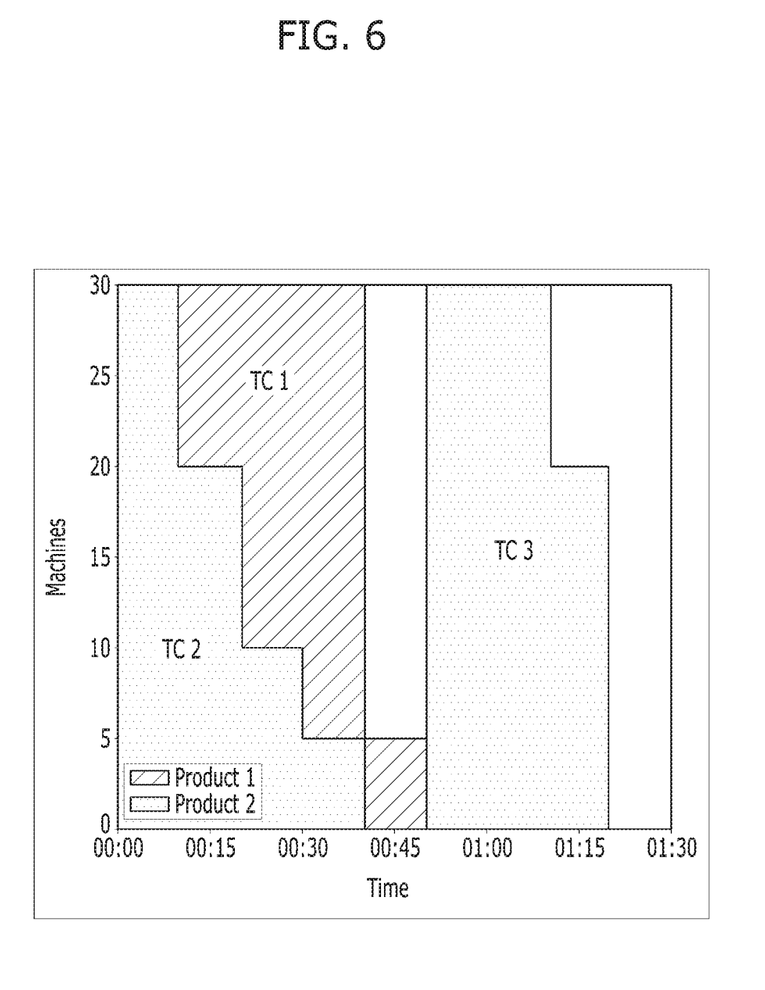
FIG. 6 is a diagram illustrating how resource distribution changes as priorities change in runtime in accordance with an embodiment of the present invention.

FIG. 6 illustrates how resource distribution changes as priorities change in runtime in accordance with an embodiment of the present invention.

Testing campaigns (as described with reference to FIG. 2) start with the same product priorities as in the example described in connection with FIG. 4. That is, $P_1=1$, $P_2=2$. At 00:15 product priorities are changed manually as follows; $P_1$ is changed to 2, and $P_2$ is changed to 1. At 00:20 the algorithm is triggered on completion of tests, and new product priorities are used for calculations: estimated values are 20 machines for Product 1 and 10 machines for Product 2. At 00:30 5 tests of TC2 end immediately after start (due to failure), and the released machines are reassigned to Product 1 due to calculations by the algorithm.

As the examples above illustrate, embodiments of the invention provide methods, which may be embodied in algorithms that gradually adapts to the changes of product needs, thus eliminating the need for manual configuration except for priority settings. Aspects of the present invention may be employed in regression testing management. The algorithm, according to embodiments of the invention, is readily adjustable to current testing campaign needs and thus helps to eliminate weaknesses of manual resource management and optimize resources usage. Moreover, aspects of the present invention may be applied to improve product robustness by revealing defects earlier and enabling engineers to address the defects in a more timely manner.

Although the foregoing embodiments have been illustrated and described in some detail for purposes of clarity and understanding, the present invention is not limited to the details provided. There are many alternative ways of implementing the invention, as one skilled in the art will appre-

What is claimed is:

1. A method of operating a testing system, which includes K products, a test distributor and L testing machines to run $M_i$ tests to test the K products, each product having an initial priority $P_i$, where each of $M_i$, K and L is an arbitrary integer greater than 0, and where i is an integer from 1 to K, the method comprising:
   determining, by the test distributor, one or more test products to be tested among the K products when a set event has triggered;
   allocating, by the test distributor, one or more test machines among the L testing machines to each of the test products based on priorities of the test products; and
   executing, by the allocated test machines, the $M_i$ tests for each of the test products,
   wherein the allocating of the one or more test machines includes:
   calculating, for each $i^{th}$ product of the test products, $l_i$ machines of the L testing machines proportionally to the initial priority $P_i$ of the $i^{th}$ product;
   allocating a number of test machines $n_i$ for testing the $i^{th}$ product based on the number of machines $l_i$ and the number of tests $M_i$, where $n_i$ is determined as the lesser of $l_i$ and $M_i$;
   determining a number of remaining machines $\tilde{L}$ based on L and $n_i$;
   accumulating $n_i$ per product; and
   repeating the calculating, allocating, determining and accumulating operations until $\tilde{L}$ is 0.

2. The method of claim 1, wherein the allocated test machines select one or more tests among the $M_i$ tests and execute the selected tests for each of the test products.

3. The method of claim 1, wherein the set event includes each time a new set of tests for a particular product starts, any testing machine is in an idle state or the initial priority of any product changes.

4. The method of claim 1, wherein the calculation of $l_i$ is also based on L, and the initial priority $P_i$ is used in a ratio with respect to the sum of all priorities.

5. The method of claim 1, wherein $P_i$ is an arbitrary integer greater than 0.

6. A testing system comprising:
   K products;
   a test distributor; and
   L testing machines to run $M_i$ tests to test the K products, each product having an initial priority $P_i$, where each of $M_i$, K and L is an arbitrary integer greater than 0, and where i is an integer from 1 to K;
   wherein the test distributor is configured to: determine one or more test products to be tested among the K products when a set event has triggered; and allocate one or more test machines among the L testing machines to each of the test products based on priorities of the test products,
   wherein the allocated test machines execute the $M_i$ tests for each of the test products, and
   wherein the test distributor is configured to perform operations of:
   calculating, for each $i^{th}$ product of the test products, $l_i$ machines of the L testing machines proportionally to the initial priority $P_i$ of the $i^{th}$ product;
   allocating a number of test machines $n_i$ for testing the $i^{th}$ product based on the number of machines $l_i$ and the number of tests $M_i$, where $n_i$ is determined as the lesser of $l_i$ and $M_i$;
   determining a number of remaining machines $\tilde{L}$ based on L and $n_i$;
   accumulating $n_i$ per product; and
   repeat the calculating, allocating, determining and accumulating operations until $\tilde{L}$ is 0.

7. The testing system of claim 6, wherein the allocated test machines select one or more tests among the $M_i$ tests and execute the selected tests for each of the test products.

8. The testing system of claim 6, wherein the set event includes each time a new set of tests for a particular product starts, any testing machine is in an idle state or the initial priority of any product changes.

9. The testing system of claim 6, wherein the calculation of $l_i$ is also based on L, and the initial priority $P_i$ is used in a ratio with respect to the sum of all priorities.

10. The testing system of claim 6, wherein $P_i$ is an arbitrary integer greater than 0.

* * * * *